Feb. 16, 1932.  R. J. NORTON  1,845,846
BRAKE MECHANISM
Filed Oct. 1, 1928
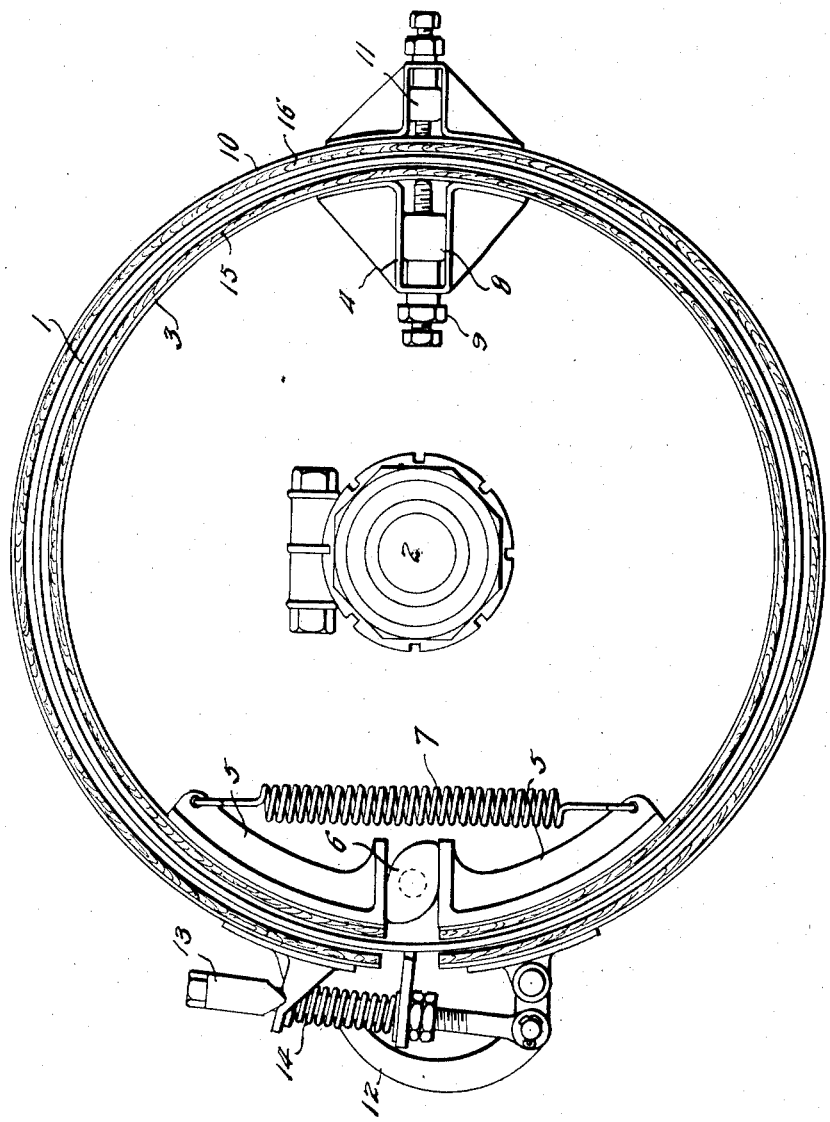
Inventor
RAYMOND J. NORTON
By M. W. McConkey
Attorney Patented Feb. 16, 1932

1,845,846

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE MECHANISM

Application filed October 1, 1928. Serial No. 309,370.

This invention relates to brake mechanisms, and pertains more specifically to automotive brakes.

As is known, the brakes universally employed upon the wheels (and propeller shafts) of automotive vehicles are of the friction type. They comprise essentially a rotor attached to a revolving wheel or shaft and an associated external strap or internal shoe. The strap or shoe is forced into frictional contact with the rotating drum so as to effect a retardation. Inasmuch as the rotor moves with considerable speed, an appreciable amount of frictional heat is generated. Where the brake application is maintained for a relatively long period of time, as in descending a long hill, the temperature of the drum and shoes or straps may be raised considerably.

If the coefficient of expansion of the material of an internal brake shoe is greater than that of the brake drum, the former will, by reason of this expansion, effect a retarding in excess of that incident to a given movement of the applying means and may cause locking of the wheels. The same result may obtain where an external band is used if the coefficient of expansion of the material of the band is less than that of the brake drum.

The present invention, therefore, contemplates a method of checking such additional braking action or seizing, due to displacement of the braking means attendant upon changes in temperature.

The invention is illustrated as embodied in a brake of both an internal expanding friction means and an external contracting friction means. While the invention is not limited in applicability, it is a construction which is particularly efficacious therein for reasons which will appear more fully hereinafter.

The single figure of the drawing, therefore, is an illustrative physical embodiment of the invention.

Prior to this time various methods have been suggested for removing the generated heat resulting from frictional braking. However, little, if any, attention has been paid to the problem of obviating the disadvantages incident to the increases in temperature to which the braking apparatus is subjected.

When an internal friction means is used with the rotating drum, the generated frictional heat may be dissipated more quickly by increasing the surface on the exterior of the braking flange. The usual method, and now the conventional one, is to provide this braking flange with circumferential fins to increase the heat radiating surface and thereby accelerate dissipation.

In those brake assemblages which employ an external strap a means to increase heat dissipation is rarely employed, though methods for accomplishing this have been suggested.

The present invention deals with the method of neutralizing the disadvantages which result from heating of the drum and brake mechanisms without entailing any complicated or expensive heat dissipating means. This comprises simply the provision of a stator or fixed braking member which is adapted to frictionally engage a rotor, the coefficient of expansion of which is chosen so as to provide, so as to speak, an automatic release of the brake upon the generation of relatively intense heat. The application of the principles of this invention can readily be appreciated by a reference to the accompanying drawing.

In the single figure of the drawing there is represented a brake drum 1 mounted in any suitable manner upon a rotating shaft 2. In the device illustrated in the drawing the brake assemblage is shown as mounted on the rear wheel of an automobile. It is to be clearly understood, however that this is merely a conventional illustration and is to be considered as exemplifying the application of the invention to any type of frictional brake.

Mounted within the brake drum and engageable with the braking flange is an internal expanding brake 3. This is illustrated for convenience as a full metallic band having an anchor lug 4 and cam thrust sections 5. This brake may be spread into frictional engagement by means of the cam 6 and returned to inoperative position by the return spring 7. The brake may be provided with an anchor pin 8 with which cooperates in the well known manner with the adjustment or brake clearance mechanism indicated generally by the numeral 9. While the internal brake has been shown as providing a full circular band, it is to be understood that this typifies any type of internal expanding brake, such as separate shoes pivoted directly to the backing plate, a plurality of articulated shoes of the Bendix type, or any other similar mechanism.

The brake drum may also be provided with an external contracting brake. On the drawing this is shown conventionally as comprising the metallic strip 10 adjustably anchored at 11 and actuated by means of the operating lever 12. This brake may be provided with any suitable type of wear take-up and return mechanism indicated by the parts 13 and 14 respectively. The internal and external braking members are provided with friction facing 15. This may comprise woven asbestos impregnated with any desired type of dope.

In accordance with the principles of the invention, the material from which the internal brake is constructed comprises a metal having a lower coefficient of thermal expansion than the metal of the brake drum and, conversely, the metal embodied in the external brake member is of a coefficient of expansion greater than the metal of the brake drum.

It will be seen that the choice of materials thus presented is a relatively wide one. Not only may relatively pure metals be utilized, but there is also available a large number of alloys both ferrous and non-ferrous. The materials which are employed for the brake stators, that is to say the internal shoes or the external strap, will depend in some degrees upon the particular ferruginous material of which the brake drum is constructed. As a simple embodiment the brake drum may be conceived as consisting of cast iron having, for example, a coefficient of expansion of .0000112. It will be seen that if the external strap structure is constructed of aluminum, so to speak, pyrogenetic release of the brake may be secured. Aluminum has a coefficient of expansion of, let it be assumed, .0000226. As the temperature of the brake drum and brake strap rises, during the brake application, the aluminous material will tend to expand at a greater rate than the iron drum, and hence will diminish the frictional pressure between the two, in other words the brake strap will automatically release.

Similarly, an automatic release of the internal shoe structure may be effected by constructing it of a material of a lower coefficient of expansion than the brake drum. A material of an extremely low coefficient of expansion and one which well illustrates the principle here involved is an alloy in the invar range, that is a ferronickel alloy having approximately 36% of nickel. This material has a coefficient of expansion approximately .0000015, in other words approximately 1/7 that of the material of the drum. It will be seen, therefore, that upon increase in temperature of the brake shoe and drum an automatic release will be effected.

It will be appreciated that alloys of the same components, but in variant proportions, may be utilized. Thus both the external strap and the internal shoes may be constructed of ferronickel. It will be remembered that as the nickel component of ferronickel is increased from 25 to 35% the thermal expansivity rapidly decreases. With further additions of nickel the expansivity increases first by rather rapid increments and then more slowly.

While, as has been stated, the invention is not limited to the use in an assemblage including an internal and an external friction means it is peculiarly advantageous in such a system. When only an internal shoe structure is used the exterior portion of the braking flange presents a heat radiating surface which is also exposed to cooling air currents, generated by movement of the vehicle. In such circumstances therefore much of the generated frictional heat will be dissipated and the total expansion of the drum and shoes will be diminished. However, when an external strap is also employed this heat radiating surface presented by the braking flange is largely eliminated and the total elongation or expansion is commensurately increased. In effect therefore the strap acts as a means to prevent the removal of heat from the drum and hence accentuates the disadvantages incident to its increase in temperature.

By constructing the brake in accordance with the present invention not only is the danger of seizing obviated, but as has been explained, a positive safety factor is substituted that is to say the braking action is automatically released.

As has been indicated a very wide choice of materials is presented, which choice will depend largely on the particular thermal characteristics of the brake drum itself. The metal or alloy which is chosen for a brake stator may, if desired, be heat treated or alloyed with another metal to impart to it the particular physical properties which are desirable for such a shoe. Thus, as an example if a ferronickel is to be used its tensile strength may be appreciably increased by the addition of a predetermined percentage of chromium. The methods of modifying characteristics of metals or alloys are well known to those skilled in the art and may here be advantageously employed.

In describing the invention a typical commercial metal and alloy have been described in detail. These are given solely for the purpose of indicating how the principles of the invention may be effected by exercising a choice of available materials according to a major governing factor of thermal expansivity, and not to define the limits of such selection.

I claim:

1. A brake apparatus comprising a metallic drum, a metallic shoe positioned within the drum and adapted to effect frictional retardation thereof, the shoe and drum being constructed of materials of relatively different coefficients of expansion to effect release of braking action on increase in temperature.

2. An internal expanding brake having a drum and friction means engageable with the drum, the friction means having a lower coefficient of thermal expansion than the drum.

3. A brake apparatus comprising a ferruginous drum, a friction shoe within the drum comprising a ferrous alloy having a coefficient of expansion less than that of the ferruginous member.

4. A brake apparatus comprising a ferruginous drum, a friction shoe within the drum comprising an alloy having a coefficient of expansion less than that of the ferruginous member.

5. A brake shoe made of a metallic material having a coefficient of expansion less than iron.

6. A brake shoe constructed of a ferro nickel alloy of the invar type.

7. A brake structure comprising a pressed steel brake drum, a backing plate sealing off the drum and a brake shoe mounted within the drum, said brake shoe being constructed of a material which has a coefficient of expansion materially less than that of the drum.

In testimony whereof I affix my signature.

RAYMOND J. NORTON.